United States Patent
Steeneken

(10) Patent No.: US 8,238,074 B2
(45) Date of Patent: Aug. 7, 2012

(54) CAPACITIVE RF-MEMS DEVICE WITH INTEGRATED DECOUPLING CAPACITOR

(75) Inventor: Peter Gerard Steeneken, Valkenswaard (NL)

(73) Assignee: EPCOS AG, Munich (DE)

(*) Notice: Subject to any disclaimer, the term of this patent is extended or adjusted under 35 U.S.C. 154(b) by 804 days.

(21) Appl. No.: 11/913,285

(22) PCT Filed: Apr. 21, 2006

(86) PCT No.: PCT/IB2006/051247
§ 371 (c)(1),
(2), (4) Date: Jul. 9, 2008

(87) PCT Pub. No.: WO2006/117709
PCT Pub. Date: Nov. 9, 2006

(65) Prior Publication Data
US 2009/0201623 A1    Aug. 13, 2009

(30) Foreign Application Priority Data
May 2, 2005  (EP) .................... 05103644

(51) Int. Cl.
*H01G 5/16* (2006.01)
*H01G 7/00* (2006.01)
*H01G 7/06* (2006.01)
(52) U.S. Cl. ...................... 361/290; 361/281
(58) Field of Classification Search ............ 361/277, 361/281, 283.2, 290
See application file for complete search history.

(56) References Cited

U.S. PATENT DOCUMENTS

| | | | | |
|---|---|---|---|---|
| 3,646,413 A * | 2/1972 | Oomen | | 361/281 |
| 3,894,198 A * | 7/1975 | Murayama et al. | | 381/114 |
| 6,229,684 B1 * | 5/2001 | Cowen et al. | | 361/278 |
| 6,242,843 B1 | 6/2001 | Pohjonen et al. | | |
| 6,441,449 B1 * | 8/2002 | Xu et al. | | 257/414 |
| 6,605,849 B1 * | 8/2003 | Lutwak et al. | | 257/415 |
| 6,700,309 B2 * | 3/2004 | Dausch et al. | | 310/330 |
| 6,909,589 B2 * | 6/2005 | Huff | | 361/281 |
| 6,992,878 B2 * | 1/2006 | Shimanouchi et al. | | 361/280 |
| 7,098,577 B2 * | 8/2006 | Mehta | | 310/332 |
| 7,161,791 B2 * | 1/2007 | Lynch et al. | | 361/283.3 |
| 7,459,833 B2 * | 12/2008 | Kawakubo et al. | | 310/328 |
| 7,592,739 B2 | 9/2009 | Robert | | |
| 7,749,792 B2 * | 7/2010 | Fedder et al. | | 438/54 |
| 2002/0171517 A1 | 11/2002 | Guo et al. | | |
| 2005/0099236 A1 * | 5/2005 | Kawakubo et al. | | 331/107 A |
| 2006/0227489 A1 * | 10/2006 | Bunyan et al. | | 361/160 |

FOREIGN PATENT DOCUMENTS

| | | |
|---|---|---|
| EP | 04105342.2 | 10/2004 |
| JP | 05251270 A * | 9/1993 |
| JP | 2000-030595 A | 1/2000 |
| WO | 02096796 A2 | 12/2002 |
| WO | WO 03/069776 A2 | 8/2003 |
| WO | 2004059679 A1 | 7/2004 |

* cited by examiner

Primary Examiner — Eric Thomas
Assistant Examiner — David M Sinclair
(74) Attorney, Agent, or Firm — Slater & Matsil, L.L.P.

(57) ABSTRACT

The present invention provides a capacitive RF-MEMS device comprising a vertically integrated decoupling capacitor (14). The decoupling capacitor (14) therefore does not take extra area. Furthermore, the RF-MEMS according to the invention needs less interconnects, which also saves space and which reduces the series inductance/resistance in the RF path.

19 Claims, 8 Drawing Sheets

CAPACITIVE RF-MEMS DEVICE WITH INTEGRATED DECOUPLING CAPACITOR

The present invention relates to capacitive RF-MEMS devices. More particularly, the invention relates to a RF-MEMS device which does not require a large area and has a reduced series inductance/resistance and to a method for the manufacturing of such as device.

The development of MEMS (Microelectromechanical Systems) technology makes it possible to fabricate electromechanical and microelectronics components in a single device. By utilizing electromechanical architecture on a miniature (or micro-) scale, RF-MEMS switches combine the advantages of traditional electromechanical switches (low insertion loss, high isolation, extremely high linearity) with those of solid-state switches (low power consumption, low mass, long lifetime). RF-MEMS switches furthermore have the advantage of having the possibility for low-cost integration on a variety of substrates, including substrates bearing active semiconductor devices.

An RF-MEMS device is essentially an adjustable capacitor constructed from two conductive plates—one on the surface of a silicon chip and the other suspended a matter of micrometers above it. The suspended plate is created by etching underneath specially designed conductive layers on the chip. The capacitance between these two plates is adjusted by altering the separation between them, using the attractive force of an applied electrostatic field to physically move the suspended plate up and down.

These micro-scale adjustable capacitors can e.g. be used to dynamically match a mobile phone's RF power amplifier to its antenna, providing optimum electrical conditions in which energy losses are kept to a minimum. More RF power is transferred to the antenna, which improves the phone's performance. Less energy is wasted, which reduces the drain on the battery and therefore improves the phone's talk time. In existing mobile phones this matching function has to be performed using traditional semiconductor devices that are not electrically perfect and take up a lot of space. Other applications for these types of switches are wireless network devices (PDA's, laptops, etc.), cars, satellite communications, computers, and so on.

FIG. 1 is a schematic illustration of mechanical and electrical connections in a conventional capacitive RF-MEMS switch or MEMS switchable capacitor. A first or bottom electrode 1 is fixed on a substrate 2 and a second or top electrode 3 is movable with respect to the substrate 2 under a spring force, presented in FIG. 1 as a suspension to a cover 8 by means of a spring 4 having a spring constant k. Hereby, it has to be remarked that the cover 8 may usually be identical to the substrate 2 and the spring 4 may usually be an in-plane flexural beam. On top of the fixed electrode 1 a dielectric layer 5 is provided, with a thickness $g_d$ and a dielectric constant $\epsilon_d$. When spring 4 is relaxed, there is an air gap 6 with a distance g between the top of the dielectric layer 5 and the bottom of the top electrode 3.

To close the switch a DC voltage Vdc is applied to the top electrode 3, whereas the first or bottom electrode 1 is kept at ground potential (or vice versa, bottom electrode 1 and top electrode 3 are electrically interchangeable). By applying the DC voltage Vdc, the air gap 6 between the top electrode 3 and the dielectric layer 5 becomes smaller, and thus also the distance between top electrode 3 and bottom electrode 1. As the distance g between the electrodes 1 and 3 becomes smaller, the capacitance becomes larger.

Such MEMS switchable or tunable capacitor can be used in a radio-frequency (RF) signal electronics circuit. Because it is usually undesirable to have a large DC voltage present in RF electronics, a DC decoupling capacitor C needs to be provided, which takes up considerable chip area. On the other hand, to prevent RF current leaking away through the dc actuation line, a big resistor R (or coil L) is needed.

Because the decoupling capacitor C is coupled in series with the MEMS capacitor, it strongly increases the total area needed. For example, if a closed capacitance of $C_c$=10 pF is needed, and the MEMS capacitance density is $c_{MEMS}$=75 pF/mm² and the capacitance density of a fixed capacitor is $c_{fix}$=150 pF/mm², then it can be shown that the minimum area $A_{tot}$ to make a capacitance of $C_c$ by means of the series combination of MEMS capacitor and decoupling capacitor C is:

$$A_{tot}=A_{MEMS}+A_{fix}=(c_{fix}/c_{MEMS})^{1/2}A_{fix}+A_{fix}=((c_{MEMS})^{1/2}+(c_{fix})^{1/2})^2 C_c(c_{MEMS}c_{fix})=((c_{MEMS}/c_{fix})^{1/2}+1)^2 A_{tot,withoutC}$$

For the example given, the total area $A_{tot}$ is 0.39 mm². If no decoupling capacitor C is needed, only an area $A_{tot,withoutC}=C_c/c_{MEMS}$=0.13 mm² is needed, therefore the total used area is increased by a factor 2.9, just by the need for the decoupling capacitor.

To avoid the need for a decoupling capacitor C, the MEMS device can be designed as a relay structure with a separate DC actuation electrode 7 and RF electrode 1. This is schematically illustrated in FIG. 2. Although this configuration saves the area for the fixed capacitor C, extra area is needed for the DC actuation electrode 7. Usually this will mean that the area of such a relay will be at least a factor 2 larger than $A_{tot,withoutC}=C_c/c_{MEMS}$.

Another disadvantage of the relay structure as illustrated in FIG. 2 is that the electrostatic force of Vdc is applied only at the points were the DC actuation electrode 7 is present. Because the force at the location of electrode 1 is only indirect, it will be less strong. This will have two major disadvantages:

At the same DC voltage the force at the RF electrode 1 will be less, which usually gives a lower capacitance density. Sometimes even an air gap 6 will remain present in the closed state of the RF-MEMS switch.

The force induced by the RF voltage can induce large capacitance changes, because this force is located at electrode 1.

Both problems can be reduced by changing the process such that the air gap 6 is slightly smaller at the location of electrode 1. This, however, leads to an increase of process complexity while the disadvantage of the large area remains.

It is an object of the present invention to provide an improved RF-MEMS and a method for the manufacturing of such a RF-MEMS device. An advantage of a device in accordance with the present invention is that it can have a reduced chip area and a reduced series inductance/resistance.

The above objective is accomplished by a method and device according to the present invention.

Particular and preferred aspects of the invention are set out in the accompanying independent and dependent claims. Features from the dependent claims may be combined with features of the independent claims and with features of other dependent claims as appropriate and not merely as explicitly set out in the claims.

The present invention provides a capacitive RF-MEMS device comprising a first electrode which is fixed to a substrate lying in a plane, and a second electrode suspended above the first electrode and movable with respect to the substrate. The device according to the present invention furthermore comprises an actuation electrode integrated between the first and second electrode in a direction substantially perpendicular to the plane of the substrate. An air gap is present between the first electrode and the actuation electrode, or between the second electrode and the actuation electrode. Capacitance of the RF-MEMS device may be adjusted by changing the separation between the first and the second electrode, using an attractive force of an applied electrostatic field to physically move the second electrode, which is the suspended electrode, up and down, thus changing the thickness of the air gap.

The RF-MEMS device according to the invention has a significantly reduced area compared to prior art RF-MEMS devices. Furthermore, less interconnects are required which again leads to area reduction but also leads to reduced equivalent series resistance and reduced equivalent series inductance.

According to embodiments of the invention, the actuation may be buried between a first dielectric layer and a second dielectric layer, thus forming a stack.

According to a preferred embodiment of the invention, the stack may be positioned on top of the first electrode, in which case the air gap is present between the stack and the second electrode. In this case, a DC voltage Vdc may be applied to the actuation electrode and a RF voltage Vrf may be applied between the first electrode and the second electrode.

In other embodiments, the second electrode may have a bottom oriented towards the first electrode and the stack may be positioned at the bottom of the second electrode, in which case the air gap is present between the stack and the first electrode.

In still a further embodiment, the second electrode has a bottom oriented towards the first electrode and a first dielectric layer may be positioned on top of the first electrode and the actuation electrode may be positioned at a bottom of a second dielectric layer which is located at the bottom of the second electrode. In this case, an air gap is present between the actuation electrode and the first dielectric layer on top of the first electrode.

In further embodiments, the second electrode has a bottom oriented towards the first electrode and the actuation electrode may be positioned on top of a first dielectric layer which is located on top of the first electrode and a second dielectric layer may be located at the bottom of the second electrode. In this case, an air gap is present between the actuation electrode and the second dielectric layer at the bottom of the second electrode.

The first electrode may have a first area, the second electrode may have a second area and the actuation electrode may have a third area, the first, second and third area extending in a direction substantially parallel to the plane of the substrate. In embodiments according to the present invention, the first, second and third area may be substantially the same. In that case, a direct electrostatic force may be present over the full capacitor area. The direct electrostatic force will be present over the full RF capacitor area as long as the actuation electrode is not the smallest electrode, i.e. as long as it is bigger than the first and the second electrode. This overcomes the problems present in the prior art MEMS devices of not fully closed switches and large capacitance changes depending on the RF voltage as a result of electric forces generated by this RF voltage. In other embodiments according to the invention, at least one of the first, second and third area may be different from the others.

According to embodiments of the present invention, the first, second and the actuation electrode may be formed out of the same material, for example, out of a metal such as aluminum or aluminum copper alloy, gold or copper.

The present invention also provides a method for the manufacturing of a capacitive RF-MEMS device. The method comprises:
   providing a first electrode fixed to a substrate lying in a plane,
   providing a second electrode, the second electrode being movable with respect to the substrate,
   providing an actuation electrode integrated between the first and second electrode in a direction substantially perpendicular to the plane of the substrate.

In embodiments of the invention, providing an actuator electrode may comprise providing a stack of the actuation electrode in between a first dielectric layer and a second dielectric layer.

According to embodiments of the invention, providing a stack comprising a actuation electrode buried between a first dielectric layer and a second dielectric layer may be performed by providing a stack on top of the first electrode.

According to embodiments of the invention, the second electrode may have a bottom oriented towards the first electrode, wherein providing a stack comprising an actuation electrode buried between a first dielectric layer and a second dielectric layer may be performed by providing a stack at the bottom of the second electrode.

The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference Figures quoted below refer to the attached drawings.

Figure 1:
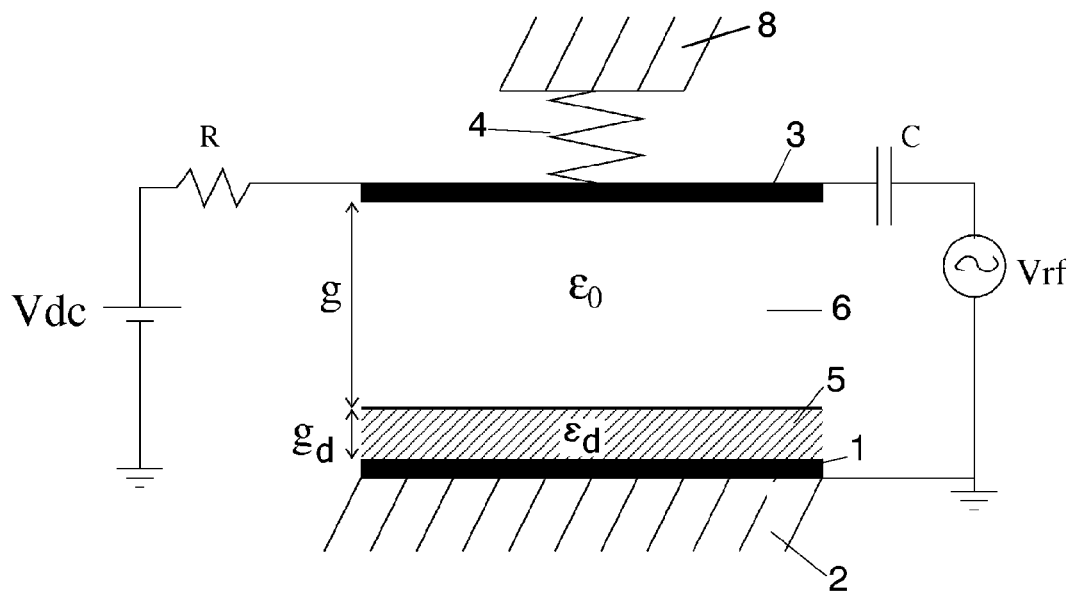
FIG. 1 is a schematic illustration of mechanical and electrical connections in a conventional capacitive RF-MEMS switch.

In the different Figures, the same reference signs refer to the same or analogous elements.

The present invention will be described with respect to particular embodiments and with reference to certain drawings but the invention is not limited thereto but only by the claims. Any reference signs in the claims shall not be construed as limiting the scope. The drawings described are only schematic and are non-limiting. In the drawings, the size of some of the elements may be exaggerated and not drawn on scale for illustrative purposes. Where the term "comprising" is used in the present description and claims, it does not exclude other elements or steps. Where an indefinite or definite article is used when referring to a singular noun e.g. "a" or "an", "the", this includes a plural of that noun unless something else is specifically stated.

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

The present invention provides a RF-MEMS device with an integrated decoupling capacitor and a method for the manufacturing of such a RF-MEMS device. The RF-MEMS device according to the present invention has a reduced chip area and reduced series inductance/resistance.

Figure 3:
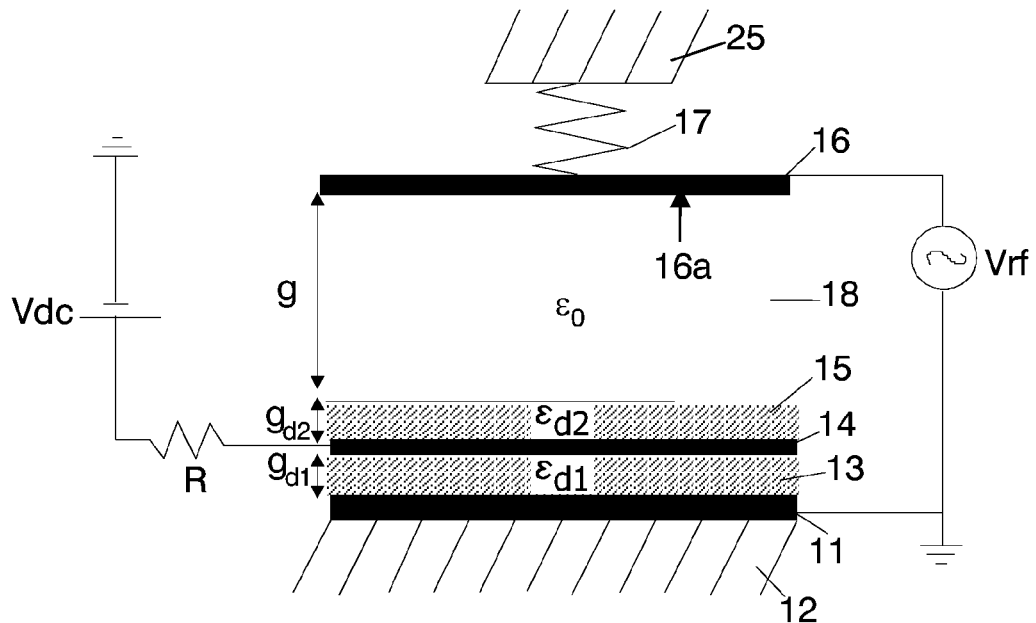
FIG. 3 is a schematic illustration of a MEMS device according to a first embodiment of the present invention.

FIG. 3 illustrates the mechanical and electrical connections in a RF-MEMS device according to a first and preferred embodiment of the present invention. According to this first embodiment, the RF-MEMS device may comprise a first electrode 11 positioned onto a substrate 12. The first electrode 11 may, for example, be formed out of an electrically conductive material, e.g. metal such as, for example, aluminum, aluminum copper alloy, copper or gold, and may have a thickness of between 50 nm and 2000 nm, for example 500 nm. The first electrode 11 may preferably be as thick as possible in order to minimize the RF resistance, but may however not be too thick in order to prevent step coverage problems from occurring. The first electrode 11 is also called a fixed electrode as it is fixed onto the substrate 12. In embodiments of the present invention, the term "substrate" may include any underlying material or materials that may be used, or upon which a device, a circuit or an epitaxial layer may be formed. In other alternative embodiments, this "substrate" may include a semiconductor substrate such as e.g. a doped silicon, a gallium arsenide (GaAs), a gallium arsenide phosphide (GaAsP), an indium phosphide (InP), a germanium (Ge), or a silicon germanium (SiGe) substrate. The "substrate" may include for example, an insulating layer such as a $SiO_2$ or an $Si_3N_4$ layer in addition to a semiconductor substrate portion. Thus, the term substrate also includes silicon-on-glass, silicon-on sapphire substrates. The term "substrate" is thus used to define generally the elements for layers that underlie a layer or portions of interest. Also, the "substrate" may be any other base on which a layer is formed, for example a glass or metal layer. The substrate 12 may have a thickness of between 50 μm and 1000 μm.

On top of the first electrode 11 a first dielectric layer 13 may be positioned. The first dielectric layer 13 may preferably be a SiN layer, but may also be formed of any other suitable dielectric material such as e.g. $SiO_2$. The first dielectric layer 13 may have a thickness $g_{d1}$ of between 1 nm and 2000 nm, for example 425 nm, and a dielectric constant $\epsilon_{d1}$. The RF-MEMS device according to the present invention may furthermore comprise a relay electrode or actuation electrode 14 which may, in this first embodiment, be positioned on top of the first dielectric layer 13. The relay or actuation electrode 14 may also be formed of an electrically conductive material, for example a metal such as e.g. aluminum, aluminum copper alloy, copper or gold, and may have a thickness of between 50 nm and 2000 nm, for example 500 nm. The relay or actuation electrode 14 may, in some embodiments of the invention, have the same thickness of the first electrode 11. However, in other embodiments, the relay or actuation electrode 14 and the first electrode 11 may have a different thickness. The relay or actuation electrode 14 may preferably be as thin as possible in order to minimize the thickness of the stack formed by the substrate 12, the first electrode 11, the first dielectric layer 13, the actuation electrode 14 and the second dielectric layer 15. On top of the relay or actuation electrode 14 a second dielectric layer 15 may be formed. In preferred embodiments according to the invention this may be done by depositing a layer of suitable dielectric material, preferably SiN. The second dielectric layer 15 may have a thickness $g_{d2}$ of between 1 nm and 2000 nm, for example 425 nm, and may have a dielectric constant $\epsilon_{d2}$. In other embodiments according to the present invention, the second dielectric layer 15 may be formed by a native oxide that is formed on top of the relay or actuation electrode 14.

The RF-MEMS device according to this first and preferred embodiment of the invention furthermore comprises a second electrode 16 which is a movable electrode which is subject to a counteracting force, for example by a movable suspension means, e.g. a spring 17, to a cover or ceiling 25. The second electrode 16 may be formed out of an electrically conductive material, for example a metal, such as e.g. aluminum, aluminum copper alloy, copper or gold, and may have a thickness of between 100 nm and 10 μm, for example 5000 nm. Preferably, the movable electrode may not be thicker than 10 μm, because this can give a too high spring constant. Another reason why it may be less favorable to have a second electrode 16 with a thickness higher than 10 μm, is that because this layer is often etched by means of an isotropic (wet) etch, the minimum feature and hole size in this layer become very big when the thickness of the layer becomes too thick. This reduces the design resolution. Furthermore, a thick layer takes more time to etch. However, for some applications it might be useful to have a thickness>10 μm. Hence, dependent on the application, the thickness of the second electrode may in some cases be higher than 10 μm. Between the bottom 16a of the second electrode 16, i.e. that surface of the second electrode 16 which is oriented towards the first electrode 11, and the top 15a of the second dielectric layer 15, i.e. that surface of the second dielectric layer 15 which is oriented towards the second electrode 16, an air gap 18 is present with a thickness g.

The first electrode 11, the relay or actuation electrode 14 and the second electrode 16 may, according to embodiments of the invention, be formed out of the same material. However, in other embodiments, the first electrode 11, the relay or actuation electrode 14 and the second electrode 16 may each be formed out of a different material. The first or fixed electrode 11 and the second or movable electrode 16 should preferably have a thickness thick enough in order to minimize the RF resistance, but are preferably not too thick (see above). In order to furthermore minimize the RF resistance, it may be favorable to use materials with low resistivity for forming the electrodes 11, 14, 16.

As can be seen from FIG. 3, for closing the switch a DC voltage Vdc may be applied to the relay or actuation electrode 14. By applying the DC voltage Vdc the second electrode 16 may move toward the actuation electrode 14. In that way, the air gap 18 and thus also the distance between the relay or actuation electrode 14 and the second electrode 11 is decreased and thus the capacitance is increased.

Although in FIG. 3 all three electrodes 11, 14, 16 are drawn to have equal area, the electrodes 11, 14, 16 can also have different area and can even be segmented. In a preferred embodiment, the area of the three electrodes 11, 14, 16 may substantially be the same, because in that way minimum area is used. The effective RF capacitor area is determined by the overlap between the first electrode 11 and the second electrode 16. Therefore, if one is bigger than the other, this may just be a waste of area because this does not add to the capacitance value. Furthermore, it has already been discussed that preferably the actuation electrode 14 should not be smaller than the first electrode 11 and/or the second electrode 16 because in that case the electrostatic force is not applied over the whole RF capacitor area. However, making electrode 14 bigger than the first electrode 11 and/or the second electrode 16 is a waste of space. It can thus be concluded that making the area of the three electrodes 11, 14, 16 equal may be the optimal solution in terms of electrostatic force and required space.

However, the second or movable electrode 16 requires some holes for etching and reduction of damping, thus its area is reduced with respect to the first or fixed electrode 11. Therefore, according to other embodiments of the invention, the three electrodes 11, 14, 16 may have different areas. The use of segmented electrodes may be favorable for reducing air damping (see EP 04105342.2 filed on the 27 Oct. 2004), if a relay type device is made (see FIG. 2) or if increased power handling is required.

Figure 2:
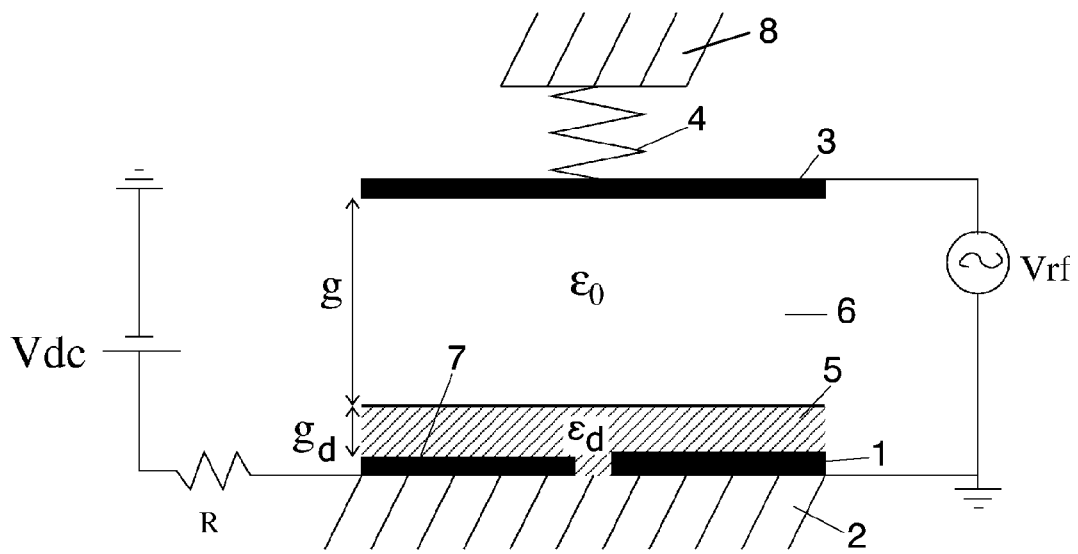
FIG. 2 is a schematic illustration of mechanical and electrical connections in a conventional relay.

In the RF-MEMS device according to this embodiment, the relay or actuation electrode 14 may be buried between the first and second dielectric layer 13, 15, hence forming a stack 13, 14, 15 on top of the first electrode 11. The stack 13, 14, 15 is vertically stacked, i.e. stacked in a direction substantially perpendicular to the plane of the substrate 11, between the first electrode 11 and the second electrode 16. Therefore, there is no need for extra chip area for adding a decoupling capacitor, which is different from the prior art RF-MEMS devices as illustrated in FIGS. 1 and 2. This also saves interconnects which again saves space and reduces series inductance/resistance in the RF path. The electrostatic DC voltage will now be located directly above the relay or actuation electrode 14, allowing an intimate contact force between electrodes.

When the RF-MEMS device is in the closed state, the RF signal will see a capacitance density of:

$$c_c = 1/(1/c_{d1} + 1/c_{d2}) = 1/(g_{d1}/\epsilon_{d1} g_{d2}/\epsilon_{d2})$$

When the RF-MEMS device is in the open state, it will see a capacitance density of $$c_o = 1/(g_{d1}/\epsilon_{d1} + g_{d2}/\epsilon_0)$$

When this situation is compared to the situation with the situation illustrated in FIG. 1, with all electrodes 1, 3, 7 having an equal area, the total area needed for the RF-MEMS device according to the present invention, in case of a closed RF capacitance of $C_c$, may be given by:

$$A_{tot} = [(c_{d1} + c_{d2})/c_{d1} c_{d2}] \cdot C_c$$

In case $c_{d1} = c_{fix} = 150$ pF/mm² and $c_{d2} = c_{MEMS} = 75$ pF/mm² an area $A_{tot}$ of 0.2 mm² is needed to manufacture a closed capacitance of 10 pF. Therefore, a space reduction of about a factor 2 may be achieved by using this configuration compared to that of FIG. 1. In practice the total space reduction will even be more because much less interconnects are needed, such as e.g. an electrical connection between the MEMS device and a decoupling capacitor.

The RF-MEMS device furthermore comprises a resistor R. The resistor R may have the same value as in the conventional set-up as illustrated in FIG. 2. The purpose of this resistor R is to prevent RF power leakage via the DC path. The amount of power leakage that can be tolerated strongly depends on the application. As an example, the MEMS device+decoupling capacitor as a series capacitor may be considered. The impedance of the bias line should be much higher than that of the MEMS capacitor which means that the resistance of resistor $R \gg 1/(\omega C)$. For example, at 1 GHz and for a capacitor of 1 pF, this means that $R \gg 159$ Ω. A typical value that may be used for the capacitor R is 10000 Ω. A too high value of the resistor R might compromise the switching speed, but usually this is not an issue because the switching speed usually is higher than 20 µs. For a capacitor of 20 pF the RC time only exceeds the switching time for $R > 1$ MΩ. It has to be noticed that, for preventing the RF power leakage via the DC path and for reducing the switching power, the resistor R may also be replaced by an inductor (not shown in the Figures).

In a second embodiment of the invention, the stack 13, 14, 15 comprising the relay or actuation electrode 14 buried in between the first dielectric layer 13 and second dielectric layer 15 may be positioned at the bottom 16a of the second electrode 16, instead of on top of the fixed or first electrode 11. In the MEMS device of this embodiment, a DC voltage may be applied to the actuation electrode 14.

Figure 4:
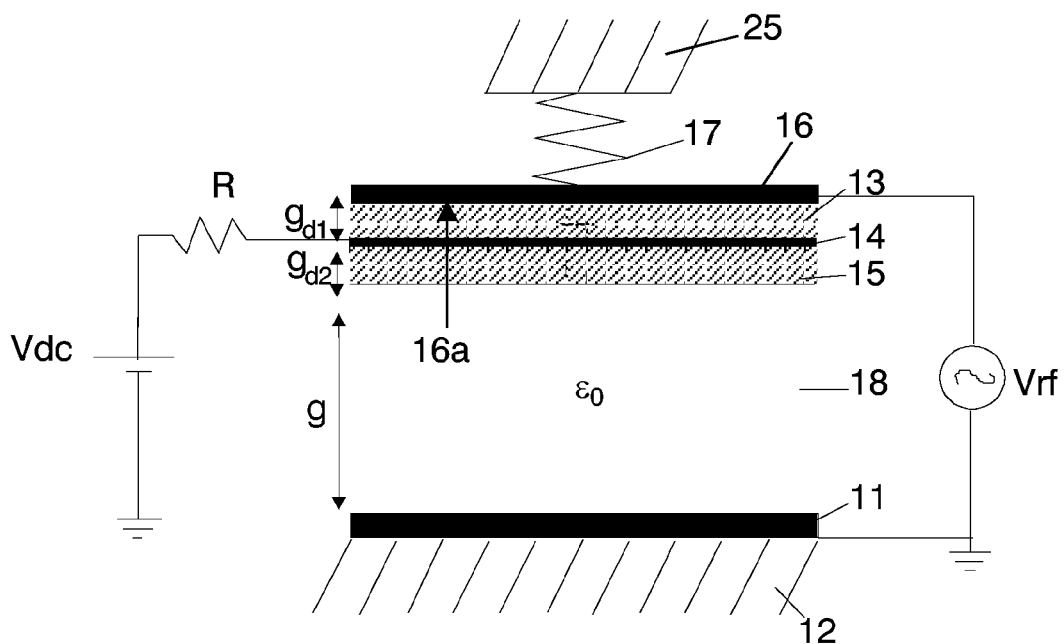
FIG. 4 is a schematic illustration of a MEMS device according to a second embodiment of the present invention.

The MEMS device according to this second embodiment is schematically illustrated in FIG. 4. There is no significant difference in functioning with respect to the MEMS device illustrated in FIG. 3 and described in the first embodiment. The implementation of the second embodiment is, however, more difficult to form and less beneficial and therefore less preferred than the first embodiment. Possible difficulties may be that the decoupling capacitor is in this case movable. Because of etching holes, which need, in the second embodiment, to go through all of the first dielectric layer 13, the relay or actuation electrode 14, the second dielectric layer 15 and the second electrode 16, available area on top is less than below the movable electrode. In the case of the MEMS device of FIG. 3, the holes only need to go through the second electrode 16. The holes reduce the capacitor area of the decoupling capacitor between the first electrode 11 and the actuation electrode. The movable electrode now becomes a multilayer comprising different types of material instead of one conductive material, e.g. metal, layer. Due to differences in stress or thermal expansion it will be difficult to keep the stack flat because bi-metal effects may bend the second or movable electrode 16. Furthermore, switching may be slower in the RF-MEMS device according to the second embodiment because now the top electrode, formed by the second electrode 16 and the stack 13, 14, 15 is heavier than in the RF-MEMS device according to the first embodiment, where the top electrode only comprises the second electrode 16.

Figure 5:
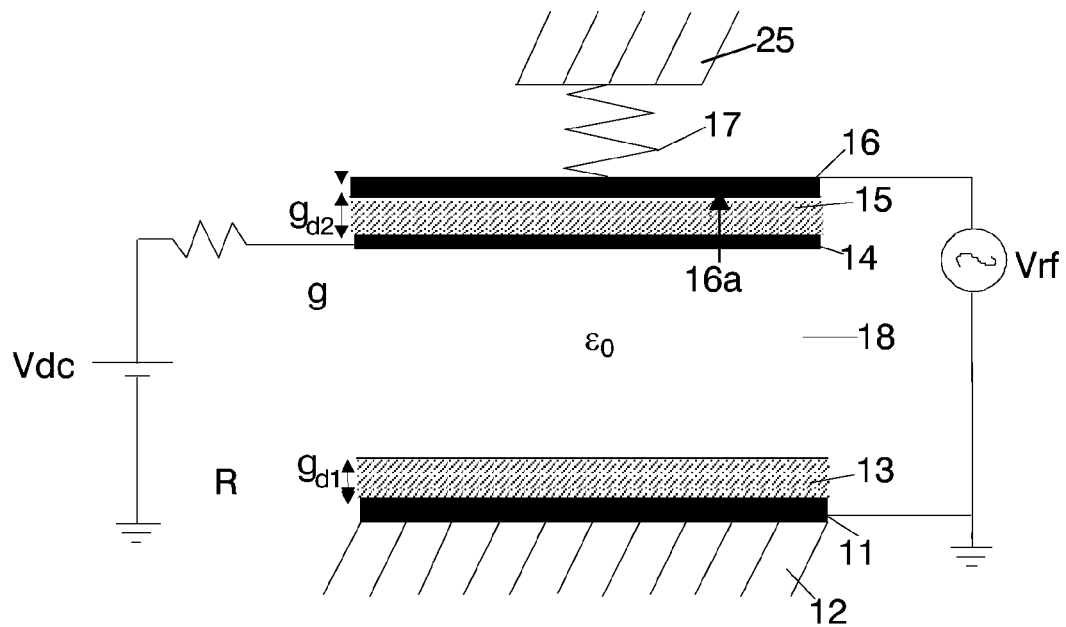
FIG. 5 and FIG. 6 illustrate alternative configurations of the MEMS device according to a third and a fourth embodiment of the present invention respectively.
Figure 6:
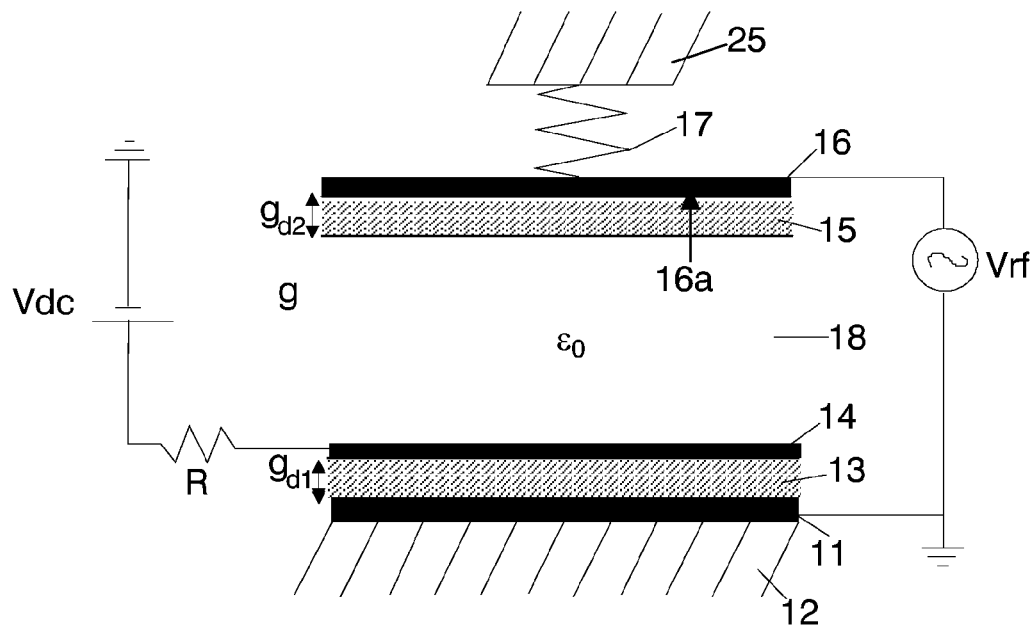

FIG. 5 and FIG. 6 illustrate alternative implementations for MEMS devices according to the present invention, and respectively described in the first and second embodiment.

In the embodiment of FIG. 5, a first dielectric layer 13 is located on top of the first or fixed electrode 11 and the relay or actuation electrode 14 is positioned at a bottom of a second dielectric layer 15 which is located at the bottom 16a of the second or movable electrode 16. A DC voltage may be applied to the actuation electrode 14.

In the embodiment of FIG. 6, the relay or actuation electrode 14 is positioned on a first dielectric layer 13 which is located on top of the first or fixed electrode 11 and a second dielectric layer 15 is located at the bottom 16a of the second or movable electrode 16. A DC voltage may be applied to the relay or actuation electrode 14.

It has, however, to be taken into account that, in case of the embodiment illustrated in FIG. 4 and FIG. 5 additional movable electrodes are required for contacting the actuation electrode. In FIG. 3, spring 17 may usually be identical to the electrical connection between the second electrode 16 and Vrf. Usually, this spring 17 may be formed in the same layer as the second electrode 16 (see FIG. 17). In FIG. 5, spring 17 should not be made just from electrode 16 but also from electrode 14 and dielectric 15. In this case the spring 17 comprises two electrical connections, i.e. one from layer 16 and one from layer 14. Therefore, two movable electrical connections ('electrodes') may be provided.

From the above, it is clear that the RF-MEMS device according to the invention has a significantly reduced area compared to prior art RF-MEMS devices. Furthermore, less interconnects are required which again leads to area reduction but also leads to reduced equivalent series resistance and reduced equivalent series inductance. If the decoupling capacitor is put next to the MEMS device, as is the case in the prior art (see FIG. 2), an electrical connection is required between the MEMS and the decoupling capacitor. This electrical connection has a length of at least the length of the side of the capacitor. This connection has furthermore a resistance which is usually proportional to its length and an inductance which is also approximately proportional to its length. Therefore, this connection increases both the series resistance and inductance. This disadvantage is overcome by a capacitive RF-MEMS device according to the present invention, which does not require such a connection and hence, shows a reduced series resistance and series inductance. Another advantage of not requiring such an inductive connection is that no inductive cross-talk with other parts of the circuit can occur.

In the MEMS device according to the first embodiment of the present invention, the electrical connection between MEMS device and decoupling capacitor is absent because the bottom plate, which is the first electrode 11, of the decoupling capacitor (formed by the first electrode 11, the first dielectric layer 13 and the relay or actuation electrode 14) is physically the same as the bottom plate (=the first electrode 11) of the MEMS capacitor, hence, no electrical connection is required between them. In the MEMS device according to the second embodiment, the top plate (=the second electrode 16) of the decoupling capacitor is physically the same as the top plate of the MEMS capacitor, which is in this embodiment also formed by the second electrode 16, and thus also needs no extra electrical connection.

When the three electrodes, i.e. the first or fixed electrode 11, the relay or actuation electrode 14 and the second or movable electrode 16 all have the same size, a direct electrostatic force may be present over the full capacitor area. This overcomes the problems present in the prior art MEMS devices of not fully closed switches and large capacitance changes. The direct electrostatic force will be present over the full RF capacitor area as long as the actuation electrode 14 is not the smallest electrode, i.e. as long as it is bigger than the first electrode 11 and the second electrode 16.

It has to be mentioned that the introduction of the integrated decoupling capacitor in the RF-MEMS device may, in some cases, add some process complexity, because an extra metal layer and dielectric layer may be required. Therefore, one extra mask will be needed. However, in some processing methods, such as in Philips' proprietary MEMS PASSI-II process which will be described hereinafter, this extra layer is already present and can be used to create the integrated decoupling capacitor. In the latter cases, the manufacturing method of the capacitive RF-MEMS device according to the invention does not become more complex.

Hereinafter, subsequent steps in a possible manufacturing process for a RF-MEMS switch according to the present invention will be described. It has to be noted that this is only a specific example and is not intended to be limiting to the invention. For example, other materials or other layer thicknesses than those that will be described in the following process may be used. Furthermore, the followed sequence of process steps is also only a specific example and may be different in other processes. Moreover, other suitable techniques may be applied for performing different steps of the proposed manufacturing process.

FIGS. 7 to 17 illustrate subsequent steps in a process for the manufacturing of a RF-MEMS device according to an embodiment of the present invention.

In a first step, a substrate 12 is provided. In embodiments of the present invention, the term "substrate" may include any underlying material or materials that may be used, or upon which a device, a circuit or an epitaxial layer may be formed. In other alternative embodiments, this "substrate" may include a semiconductor substrate such as e.g. a doped silicon, a gallium arsenide (GaAs), a gallium arsenide phosphide (GaAsP), an indium phosphide (InP), a germanium (Ge), or a silicon germanium (SiGe) substrate. The "substrate" may include for example, an insulating layer such as a $SiO_2$ or an $Si_3N_4$ layer in addition to a semiconductor substrate portion. Thus, the term substrate also includes silicon-on-glass, silicon-on sapphire substrates. The term "substrate" is thus used to define generally the elements for layers that underlie a layer or portions of interest. Also, the "substrate" may be any other base on which a layer is formed, for example a glass or metal layer.

Figure 7:
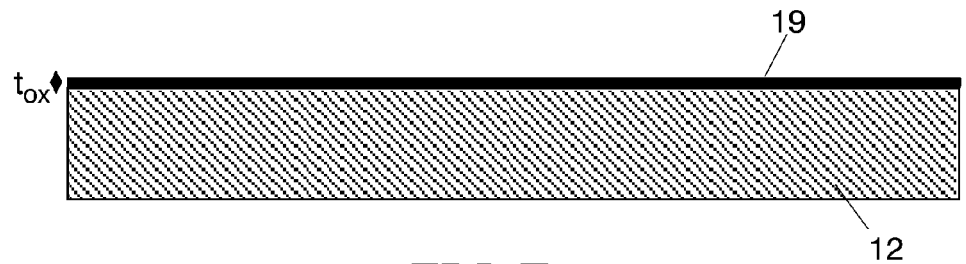
FIGS. 7 to 17 illustrate subsequent steps in a possible manufacturing process of an RF-MEMS switch according to an embodiment of the invention.

In this specific example, the substrate 12 may have a thickness of 550 μm. First, the substrate 12 may be submitted to thermal oxidation until a thermal oxide layer 19 is obtained with a thickness $t_{ox}$ of between 10 nm and 1000 nm, for example, 50 nm. This is illustrated in FIG. 7.

Figure 8:
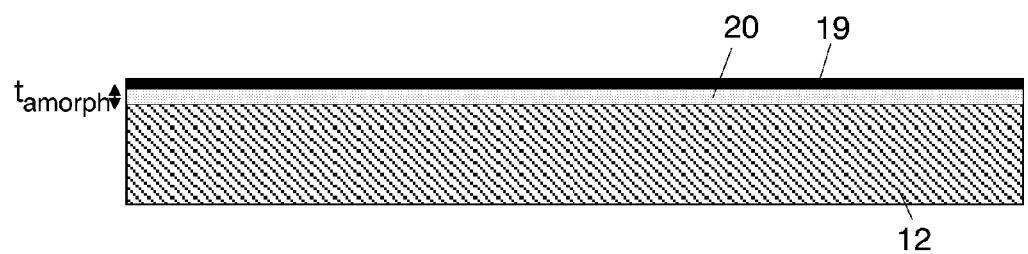

In a next step, for example, Ar ions may be implanted in the region of the substrate 12 under the thermal oxide layer 19, in order to form an amorphous region 20 (FIG. 8). For this purpose, also Ne ions, Xe ions or electron implantation may be used. The amorphous region 20 may have a thickness $t_{amorph}$ of between 10 nm and 500 μm, and may, in the example given, be 90 nm. Amorphisation of the substrate 12 or implantation of Ar ions may be done by any suitable technique known by a person skilled in the art.

Figure 9:
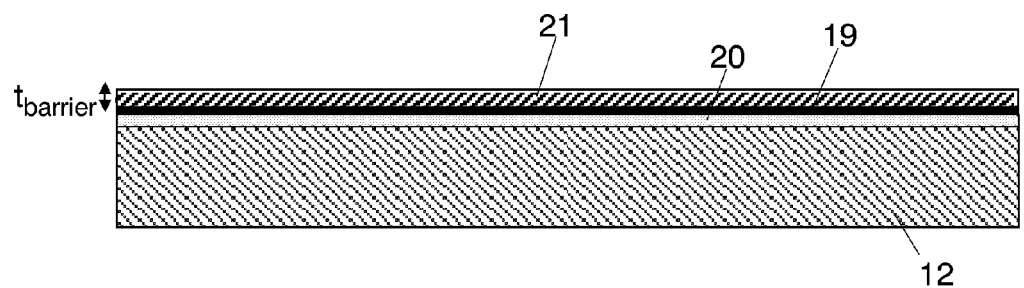

Then, a barrier layer 21 may be deposited (see FIG. 9). In the example given, the barrier layer 21 may be an $Al_2O_3$ layer and may have a thickness $t_{barrier}$ between 10 nm and 1000 nm, e.g. a thickness of about 100 nm. The barrier layer 21 may be deposited by means of e.g. reactive sputter deposition. It has to be understood that any other suitable deposition method may also be used. The barrier layer 21 may, during processing of the MEMS device, be used as an etch stop layer (see further).

Figure 10:
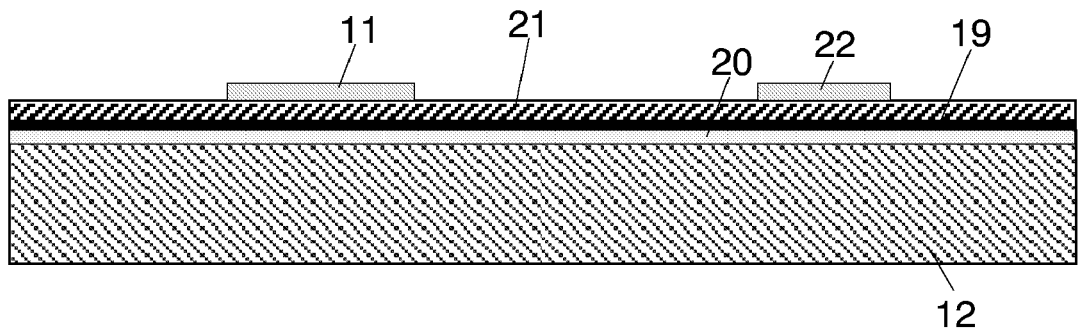

In a subsequent step, which is illustrated in FIG. 10, a first conductive layer, e.g. metal layer, which in the example given may be an aluminum layer, may be deposited by means of sputter deposition or any other suitable deposition technique. The metal layer may have a thickness between 50 nm and 2000 nm, e.g. a thickness of 500 nm. The metal layer may then be patterned by means of selective etching, hereby forming the first electrode or fixed electrode 11 and electrical connection 22. Electrical connection 22 thus has a function as an electrical connection wire between 16 and Vrf in FIG. 3 and has furthermore the function as an anchor (like reference number 25 in FIG. 3).

Figure 11:
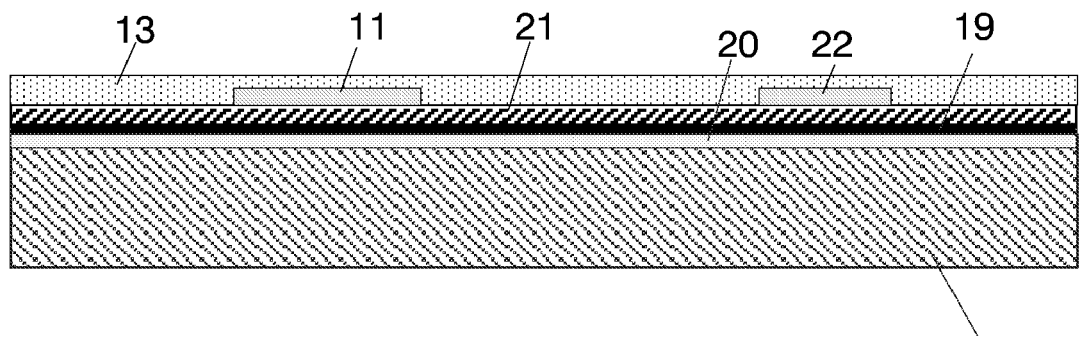

On top of the patterned metal layer 11, 22 a first dielectric layer 13 may then be deposited (FIG. 11). In the example given, the first dielectric layer 13 may be a SiN:H layer and may have a thickness between 10 nm and 2000 nm, for example a thickness of 425 nm. The first dielectric layer 13 may, according to this example, be deposited by means of plasma enhanced chemical vapor deposition (PECVD).

In a next step, a second conductive layer, e.g. a second metal layer may be deposited. The second metal layer may be an aluminum layer and may have a thickness between 50 nm and 2000 nm, for example a thickness of 500 nm. The second metal layer may be deposited by means of any suitable deposition technique, e.g. sputter deposition. The second metal layer may then be etched in order to form the relay or actuation electrode 14 (see FIG. 12).

Figure 13:
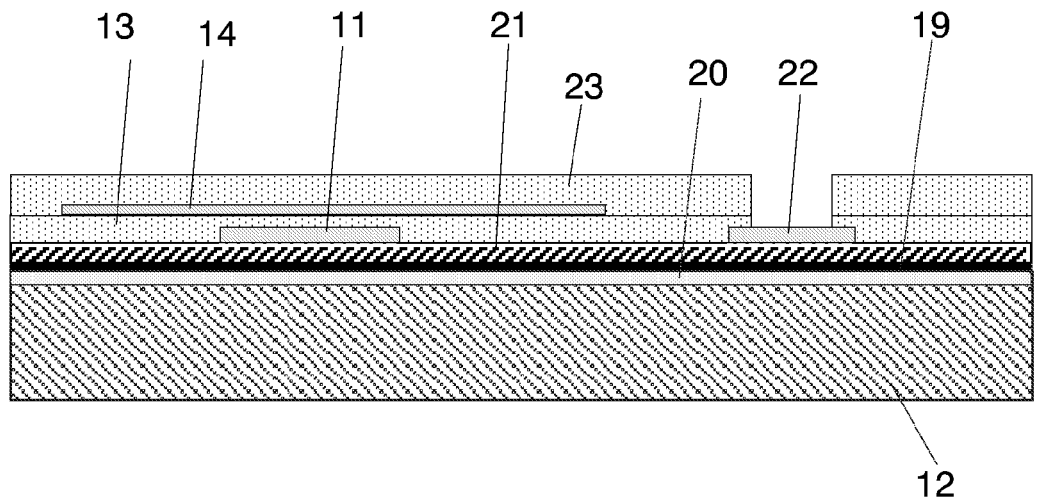

Then a sacrificial layer 23 may be deposited on top of the patterned second metal layer 14. The sacrificial layer 23 may be made of a dielectric material, e.g. a SiN:H layer, and may have a thickness between 50 nm and 2000 nm, e.g. a thickness of 425 nm. Subsequently, a corona oxide semiconductor reactive ion etching (COS RIE) step may be performed in order to obtain a structure as illustrated in FIG. 13, i.e. with a hole etched through the sacrificial layer 23 and the first dielectric layer 13 up to electrical connection or anchor 22.

Figure 14:
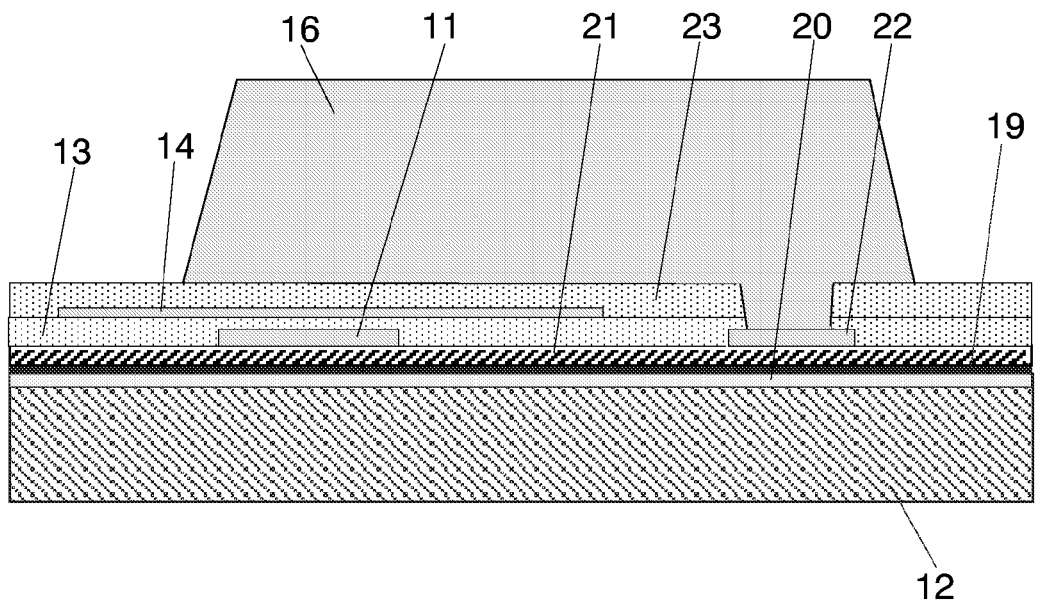

Next, a third conductive layer, e.g. metal layer, may be deposited by means of sputter deposition. The third metal layer may be an aluminum layer and may have a thickness between 100 nm and 10000 nm, e.g. a thickness of 5000 nm. A thickness like that is required in order to reduce the resistance and for sufficient strength while still being movable. The third metal layer may be etched in order to form the second electrode or removable electrode 16 as illustrated in FIG. 14.

Figure 12:
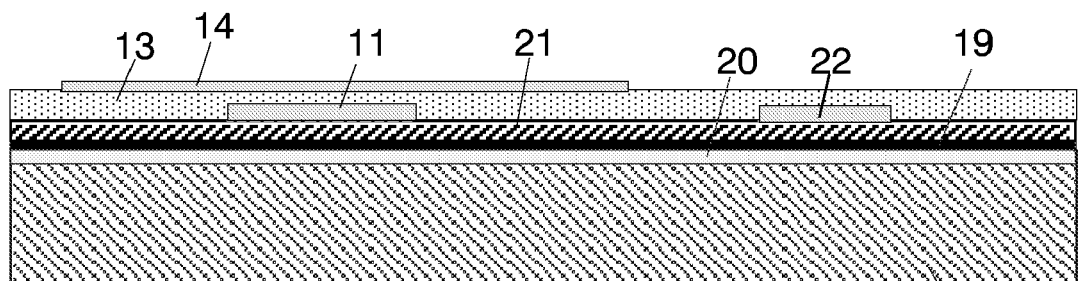
Figure 15:
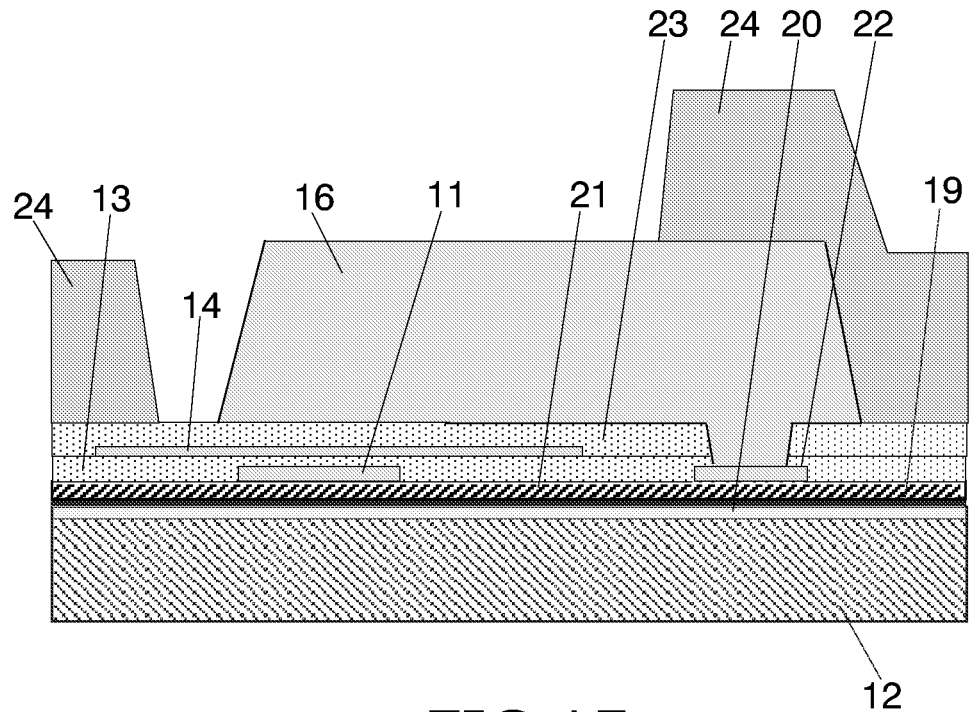

Then a resist pattern 24 is applied to the structure obtained in FIG. 12. This is illustrated in FIG. 15. The thickness of the resist pattern may be between 500 nm and 10000 nm, e.g. a thickness of 5000 nm.

Figure 16:
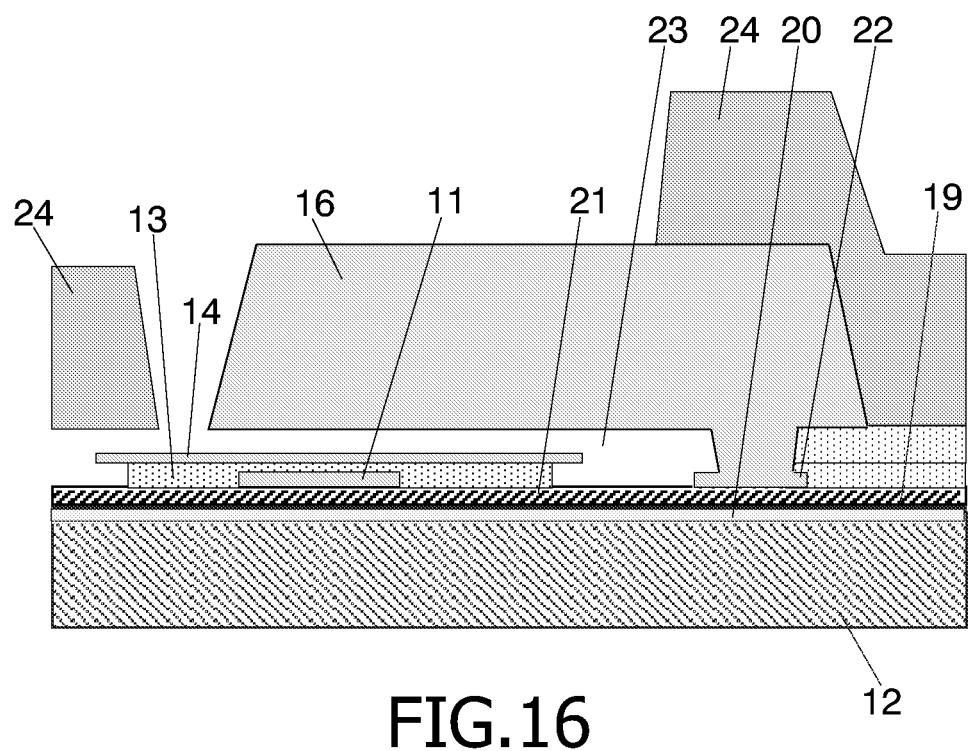
Figure 17:
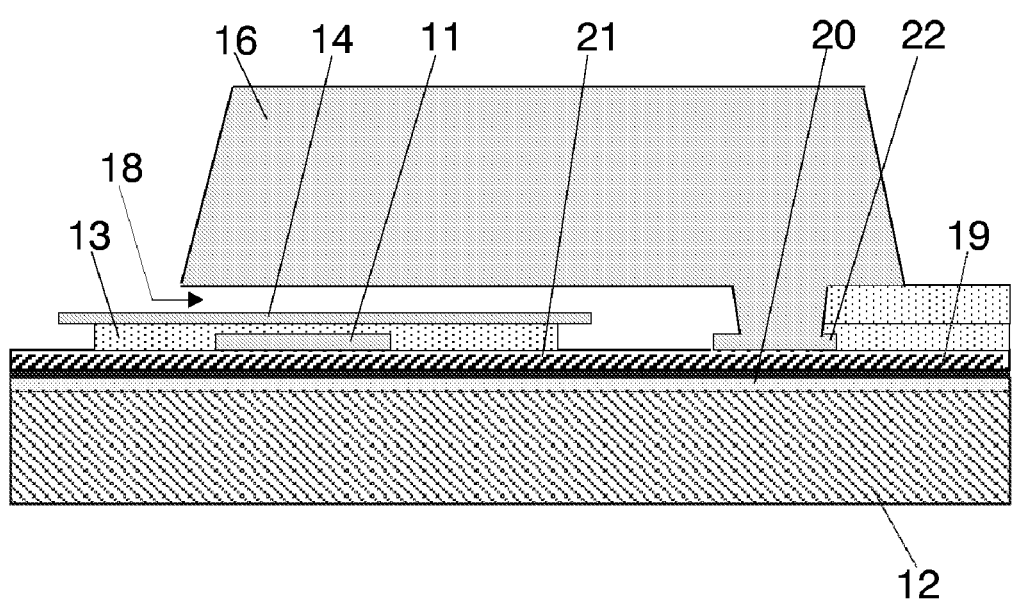

This resist pattern 24 is used for performing an etch of the sacrificial layer 23, e.g. SiN:H layer, in e.g. $CF_4$ (5% $O_2$) barrel etcher, as illustrated in FIG. 16. Care has to be taken to stop the SiN etch on time because otherwise the first dielectric layer 13 between the first or fixed electrode 11 and the relay or actuation electrode 14 would be completely etched away as well. Therefore, the etching time may be between 5 minutes and 5 hours, and may typically be 1 hour. After removal of the resist pattern 24, a device according to an embodiment of the present invention is obtained, with a freely movable second electrode 16 as illustrated in FIG. 17.

For the above specific example it has to be noted that a second dielectric layer 15 is not formed by deposition of a dielectric material. The second dielectric layer 15 in this example may be formed by a native $Al_2O_3$ oxide formed on top of the relay or actuation electrode 14. In other embodiments, however, preferably a suitable dielectric material may be deposited on top of the relay or actuation electrode and underneath the sacrificial layer 23 so as to form the second dielectric layer 15.

The method illustrated above is for forming the device according to the first embodiment of this invention. However, as will be understood by a person skilled in the art, the method may also be applied for the manufacturing of a capacitive RF-MEMS device according to the second embodiment of this invention, provided some modification of the manufacturing steps.

It is to be understood that although preferred embodiments, specific constructions and configurations, as well as materials, have been discussed herein for devices according to the present invention, various changes or modifications in form and detail may be made without departing from the scope and spirit of this invention.

The invention claimed is:

1. A capacitive RF-MEMS device comprising:
a first electrode which is fixed to a substrate lying in a plane,
a second electrode suspended above the first electrode and movable with respect to the substrate,
an actuation electrode integrated between the first electrode and the second electrode in a direction substantially perpendicular to the plane of the substrate,
a DC voltage node that carries a DC voltage coupled to the actuation electrode such that the DC voltage is applied to the actuation electrode; and
RF voltage nodes that carry an RF voltage coupled to the first electrode and the second electrode such that the RF voltage is applied between the first electrode and the second electrode.

2. A capacitive RF-MEMS device according to claim 1, wherein the actuation electrode is buried between a first dielectric layer and a second dielectric layer, thus forming a stack.

3. A capacitive RF-MEMS device according to claim 2, wherein the stack is positioned on top of the first electrode.

4. A capacitive RF-MEMS device according to claim 2, the second electrode having a bottom oriented towards the first electrode, wherein the stack is positioned at the bottom of the second electrode.

5. A capacitive RF-MEMS device according to claim 1, the second electrode having a bottom oriented towards the first electrode, wherein a first dielectric layer is positioned on top of the first electrode and wherein the actuation electrode is positioned at a bottom of a second dielectric layer which is located at the bottom of the second electrode.

6. A capacitive RF-MEMS device according to claim 1, the second electrode having a bottom oriented towards the first electrode, wherein the actuation electrode is positioned on top of a first dielectric layer which is located on top of the first electrode and wherein a second dielectric layer is positioned at the bottom of the second electrode.

7. A capacitive RF-MEMS device according to claim 1, the first electrode having a first area, the second electrode having a second area and the actuation electrode having a third area, the first, second and third area extending in a direction substantially parallel to the plane of the substrate and wherein the first, second and third area are substantially the same.

8. A capacitive RF-MEMS device according to claim 1, the first electrode having a first area, the second electrode having a second area and the actuation electrode having a third area, the first, second and third area extending in a direction substantially parallel to the plane of the substrate and wherein at least one of the first, second or third area is different from the others.

9. A capacitive RF-MEMS device according to claim 1, wherein the first electrode, the actuation electrode and the second electrode are formed out of the same material.

10. A capacitive RF-MEMS device according to claim 9, wherein the first electrode, the actuation electrode and the second electrode are formed out of aluminum or aluminum copper alloy, copper or gold.

11. A capacitive RF-MEMS device according to claim 9, wherein the first electrode, the actuation electrode and the second electrode are formed out of gold.

12. A method for the manufacturing of a capacitive RF-MEMS device, the method comprising:
- providing a first electrode fixed to a substrate lying in a plane,
- providing a second electrode, the second electrode being movable with respect to the substrate,
- providing an actuation electrode integrated between the first and second electrode in a direction substantially perpendicular to the plane of the substrate,
- applying DC voltage to the actuation electrode; and
- applying an RF voltage between the first electrode and the second electrode.

13. A method according to claim 12, wherein providing an actuator electrode comprises providing a stack of the actuation electrode in between a first dielectric layer and a second dielectric layer.

14. A method according to claim 13, wherein providing the stack comprises providing the stack on top of the first electrode.

15. A method according to claim 13, the second electrode having a bottom oriented towards the first electrode, wherein providing the stack comprising providing the stack at the bottom of the second electrode.

16. A method according to claim 12, the second electrode having a bottom wherein providing an actuation electrode comprises providing the actuation electrode at a bottom of a dielectric layer which is located at the bottom of the second electrode.

17. A method according to claim 12, wherein providing the actuation electrode comprises providing the actuation electrode on top of a dielectric layer which is located on top of the first electrode.

18. A capacitive RF-MEMS device comprising:
- a first electrode which is fixed to a substrate lying in a plane,
- a second electrode suspended above the first electrode and movable with respect to the substrate;
- a first dielectric layer overlying the first electrode;
- a second dielectric layer overlying the first electrode;
- an actuation electrode integrated between the first and second electrode in a direction substantially perpendicular to the plane of the substrate, wherein the actuation electrode is buried between the first dielectric layer and the second dielectric layer, wherein the first electrode, the actuation electrode and the second electrode are formed out of the same material;
- a DC voltage node coupled to the actuation electrode to apply DC voltage to the actuation electrode; and
- RF voltage nodes coupled to the first electrode and the second electrode to apply a RF voltage between the first electrode and the second electrode.

19. A capacitive RF-MEMS device according to claim 18, wherein the first electrode, the actuation electrode and the second electrode are formed out of aluminum, copper or aluminum copper alloy.

* * * * *

UNITED STATES PATENT AND TRADEMARK OFFICE
CERTIFICATE OF CORRECTION

Page 1 of 1

PATENT NO. : 8,238,074 B2
APPLICATION NO. : 11/913285
DATED : August 7, 2012
INVENTOR(S) : Steeneken It is certified that error appears in the above-identified patent and that said Letters Patent is hereby corrected as shown below:

In Col. 12, line 64, claim 10, delete "copper alloy, copper or gold." and insert --copper alloy or copper.--.
In Col. 13, line 23, claim 15, delete "comprising" and insert --comprises--.
In Col. 13, line 26, claim 16, delete "providing an" and insert --providing the--.

Signed and Sealed this
Thirteenth Day of November, 2012

David J. Kappos
*Director of the United States Patent and Trademark Office*